United States Patent
Line et al.

(10) Patent No.: US 10,266,073 B2
(45) Date of Patent: Apr. 23, 2019

(54) SEAT BASE FOR A SEATING ASSEMBLY

(71) Applicant: Ford Global Technologies, LLC, Dearborn, MI (US)

(72) Inventors: Johnathan Andrew Line, Northville, MI (US); Marcos Silva Kondrad, Macomb Township, MI (US); Carol Casey, Dearborn, MI (US); Rodney Charles Brinker, Eastpointe, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 254 days.

(21) Appl. No.: 15/259,871

(22) Filed: Sep. 8, 2016

(65) Prior Publication Data

US 2018/0065508 A1 Mar. 8, 2018

(51) Int. Cl.
*B60N 2/02* (2006.01)
*B60N 2/62* (2006.01)

(52) U.S. Cl.
CPC ......... *B60N 2/0284* (2013.01); *B60N 2/0232* (2013.01); *B60N 2/62* (2013.01); *B60N 2002/0236* (2013.01)

(58) Field of Classification Search
CPC ...... B60N 2/0284; B60N 2/0232; B60N 2/62; A47C 1/023
USPC .................................................. 297/284.11
See application file for complete search history.

(56) References Cited

U.S. PATENT DOCUMENTS

| | | | | |
|---|---|---|---|---|
| 4,541,669 A | * | 9/1985 | Goldner | B60N 2/62 297/284.11 |
| 4,878,529 A | | 11/1989 | Hormann | |
| 4,915,447 A | * | 4/1990 | Shovar | B60N 2/0284 297/284.11 |
| 5,667,427 A | | 9/1997 | Airhart et al. | |
| 6,079,767 A | | 6/2000 | Faubert et al. | |
| 6,106,063 A | * | 8/2000 | Dauphin | A47C 1/023 297/284.1 |
| 6,189,971 B1 | * | 2/2001 | Witzig | A47C 1/023 297/284.1 |
| 6,595,586 B2 | | 7/2003 | Brightbill et al. | |
| 7,614,693 B2 | * | 11/2009 | Ito | B60N 2/0284 297/284.11 |
| 7,753,446 B2 | * | 7/2010 | Kubler | B60N 2/0232 297/284.11 |
| 7,874,621 B2 | * | 1/2011 | Gumbrich | B60N 2/0284 297/284.11 |
| 7,909,401 B2 | * | 3/2011 | Hofmann | B60N 2/0284 297/284.11 |
| 7,922,142 B2 | | 4/2011 | Koutsky et al. | |
| 7,997,648 B2 | * | 8/2011 | Becker | B60N 2/0284 297/284.11 |
| 8,210,611 B2 | * | 7/2012 | Aldrich | A47C 1/023 297/284.11 |
| 8,579,373 B2 | * | 11/2013 | Pradier | B60N 2/0232 297/284.11 |

(Continued)

*Primary Examiner* — David R Dunn
*Assistant Examiner* — Tania Abraham
(74) *Attorney, Agent, or Firm* — Vichit Chea; Price Heneveld LLP

(57) ABSTRACT

A seat base for a seating assembly includes a thigh-extension plate and an extension track engaged with the thigh-extension plate. A thigh-extension slider engages with the extension track. A plurality of stabilizer tabs are integrally formed with the thigh-extension slider.

17 Claims, 7 Drawing Sheets

(56) References Cited

U.S. PATENT DOCUMENTS

| | | | |
|---|---|---|---|
| 9,016,785 B2 * | 4/2015 | Freisleben | B60N 2/0232 297/284.11 |
| 2008/0191531 A1 * | 8/2008 | Hoffmann | B60N 2/0284 297/284.1 |
| 2008/0231099 A1 * | 9/2008 | Szczepkowski | A47C 7/022 297/284.11 |
| 2009/0039690 A1 * | 2/2009 | Simon | B60N 2/0224 297/344.1 |
| 2013/0306825 A1 | 11/2013 | Brodersen | |
| 2014/0292051 A1 * | 10/2014 | Planson | B60N 2/0232 297/337 |
| 2015/0352980 A1 * | 12/2015 | Rehfuss | B60N 2/0232 297/284.11 |

* cited by examiner

SEAT BASE FOR A SEATING ASSEMBLY

FIELD OF THE DISCLOSURE

The present disclosure generally relates to a seating assembly. More specifically, the present disclosure relates to a thigh-extension for a seating assembly.

BACKGROUND

As movable seating assembly components are adjusted forward, back, up, down, out, in, and/or rotated there is a tendency for "binding" or "chuck" to occur laterally or perpendicularly to the direction of travel or force being applied. This failure mode can cause the features of movable seating assembly components to become inoperable, result in damage to components, and/or result in a significant reduction in the speed of operation, which can lead to customer dissatisfaction.

SUMMARY

According to one aspect of the present disclosure, a vehicle seating assembly includes a seat carrier, which includes first and second independent thigh supports. Each of the thigh supports includes a thigh-extension plate having inner and outer extension tracks. A thigh-extension slider engages with the thigh-extension plate. The thigh-extension slider defines inner and outer grooves that slidably engage with the inner and outer extension tracks of the thigh-extension plate, respectively. Integrated stabilizer tabs are disposed in the thigh-extension slider.

According to another aspect of the present disclosure, a thigh-extension for a seating assembly includes a metallic thigh-extension plate. An extension track engages with the metallic thigh-extension plate. A thigh-extension slider has an integral groove slidably engaged with the extension track. A plurality of stabilizer tabs are integrally formed with the thigh-extension slider.

According to yet another aspect of the present disclosure, a seat base for a seating assembly includes a thigh-extension plate. An extension track engages with the thigh-extension plate. A thigh-extension slider engages with the extension track. A plurality of stabilizer tabs are integrally formed with the thigh-extension slider.

The stabilizer tabs of the present disclosure work in unison to maintain the thigh-extension slider on the centerline of its travel by providing a transverse tension force along at least one of the X-, Y-, and Z-axis of the vehicle seating assembly. By maintaining the thigh-extension slider on its centerline of travel, binding, chuck, and otherwise lateral or perpendicular undesired motion of the thigh-extension slider is prevented.

These and other aspects, objects, and features of the present disclosure will be understood and appreciated by those skilled in the art upon studying the following specification, claims, and appended drawings.

DETAILED DESCRIPTION

Figure 1:
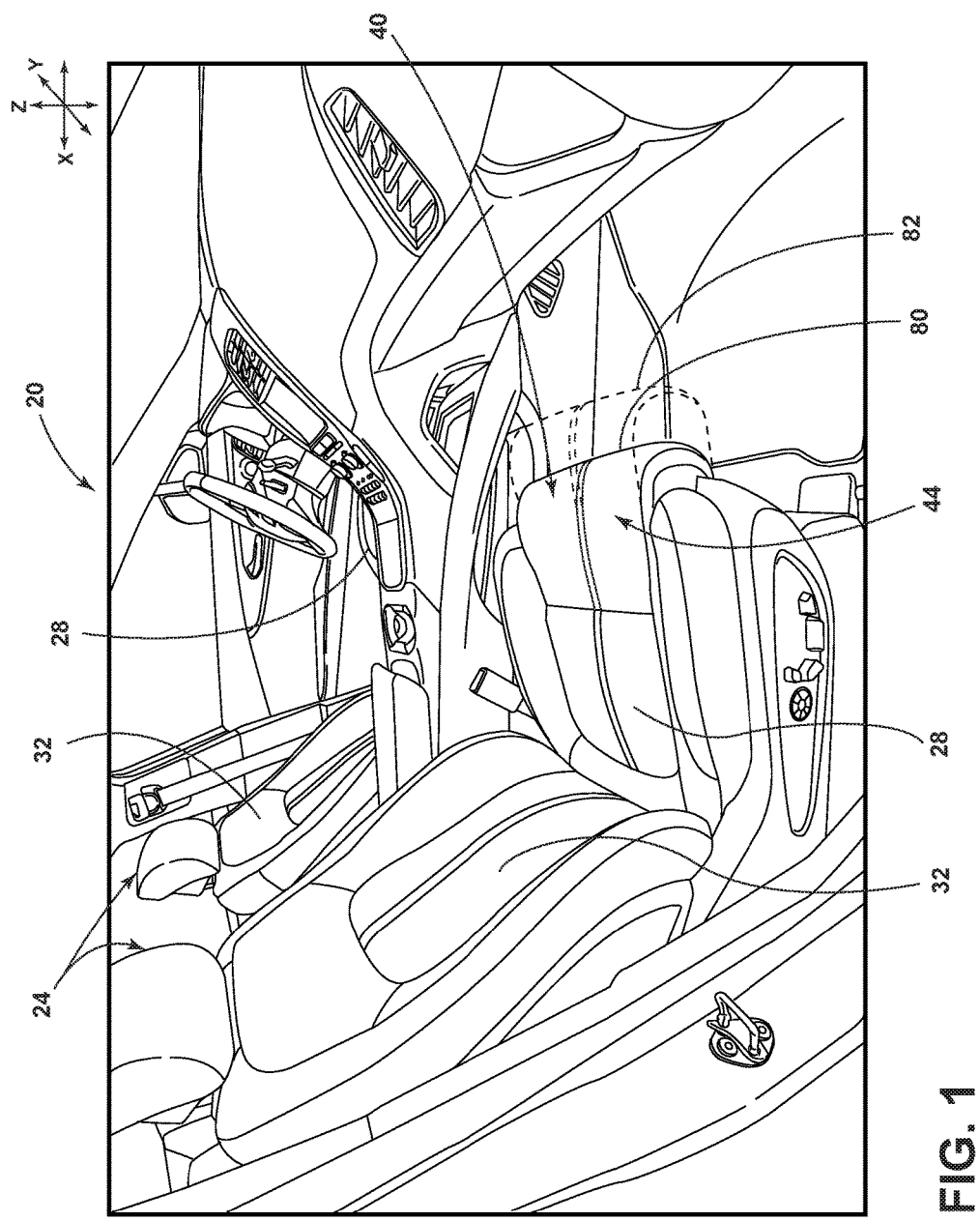
FIG. 1 is a side view of a vehicle seating assembly within a cabin of a vehicle.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a thigh-extension. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Referring to FIGS. 1-7, reference numeral 20 generally designates a vehicle, such as a wheeled motor vehicle. The vehicle 20 is shown having one or more vehicle seating assemblies 24, each having a seat 28 and a seatback 32. The vehicle seating assembly 24 is equipped with a seat carrier 36 that includes a first independent thigh support 40 and a second independent thigh support 44. Each of the independent thigh supports 40, 44 include a thigh-extension plate 48 with an inner extension track 52 and an outer extension track 56. Additionally, each of the independent thigh supports 40, 44 include a thigh-extension slider 60. The thigh-extension slider 60 engages with the thigh-extension plate 48. More specifically, the thigh-extension slider 60 defines an inner groove 64 and an outer groove 68 that slidably engage with the inner and outer extension tracks 52, 56 of the thigh-extension plate 48, respectively. Stabilizer tabs 70 are integrally formed in the thigh-extension slider 60.

Figure 2:
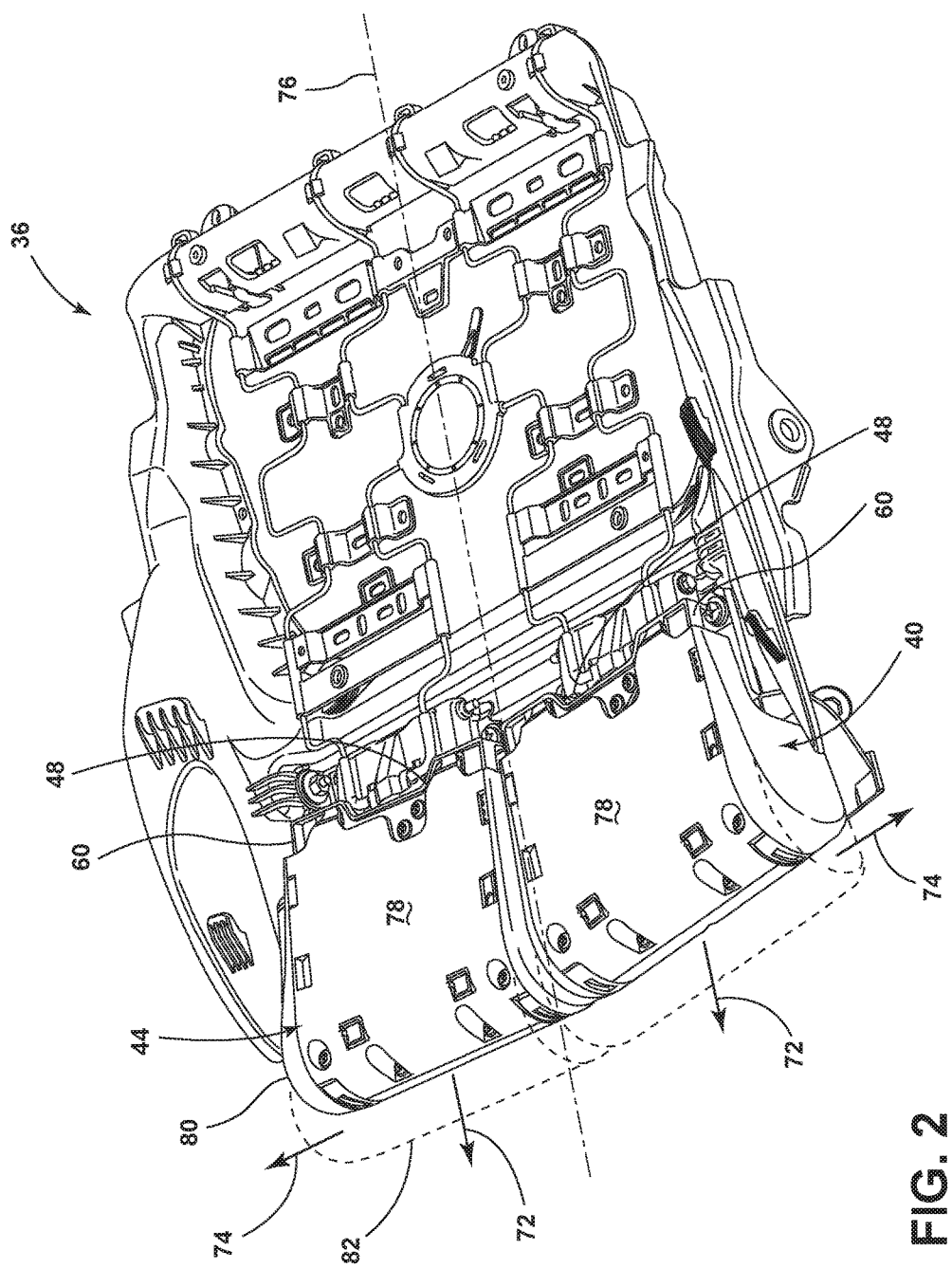
FIG. 2 is a top perspective view of one embodiment of a seat carrier of the vehicle seating assembly.

Referring now to FIG. 2, a top perspective view of the seat carrier 36 is shown. The first and second independent thigh supports 40, 44 are operably coupled to the seat carrier 36 by the thigh-extension plate 48. The independent thigh supports 40, 44 are capable of extension movements 72 away from the seatback 32 (FIG. 1) and outward movements 74 away from a central axis 76 of the seat carrier 36. The independent thigh supports 40, 44 include the thigh-extension plate 48, the thigh-extension slider 60, and a thigh-extension cover plate 78. The independent thigh supports 40, 44 can be operated between at least a retracted position 80 and an extended position 82. It is contemplated that the thigh-extension plate 48 can include a metallic panel that can be made of various materials that include, but are not limited to, steel, aluminum, metallic alloys, composite materials, polymers, combinations thereof, and other similar rigid materials that can provide structural and robust support for the independent thigh supports 40, 44 of the seat 28. It is also contemplated that the thigh-extension plate 48 can be operably coupled to the seat carrier 36 such that movement of the thigh-extension plate 48 can correspond to various lateral, vertical, and/or rotational movements of the independent thigh supports 40, 44.

Figure 3:
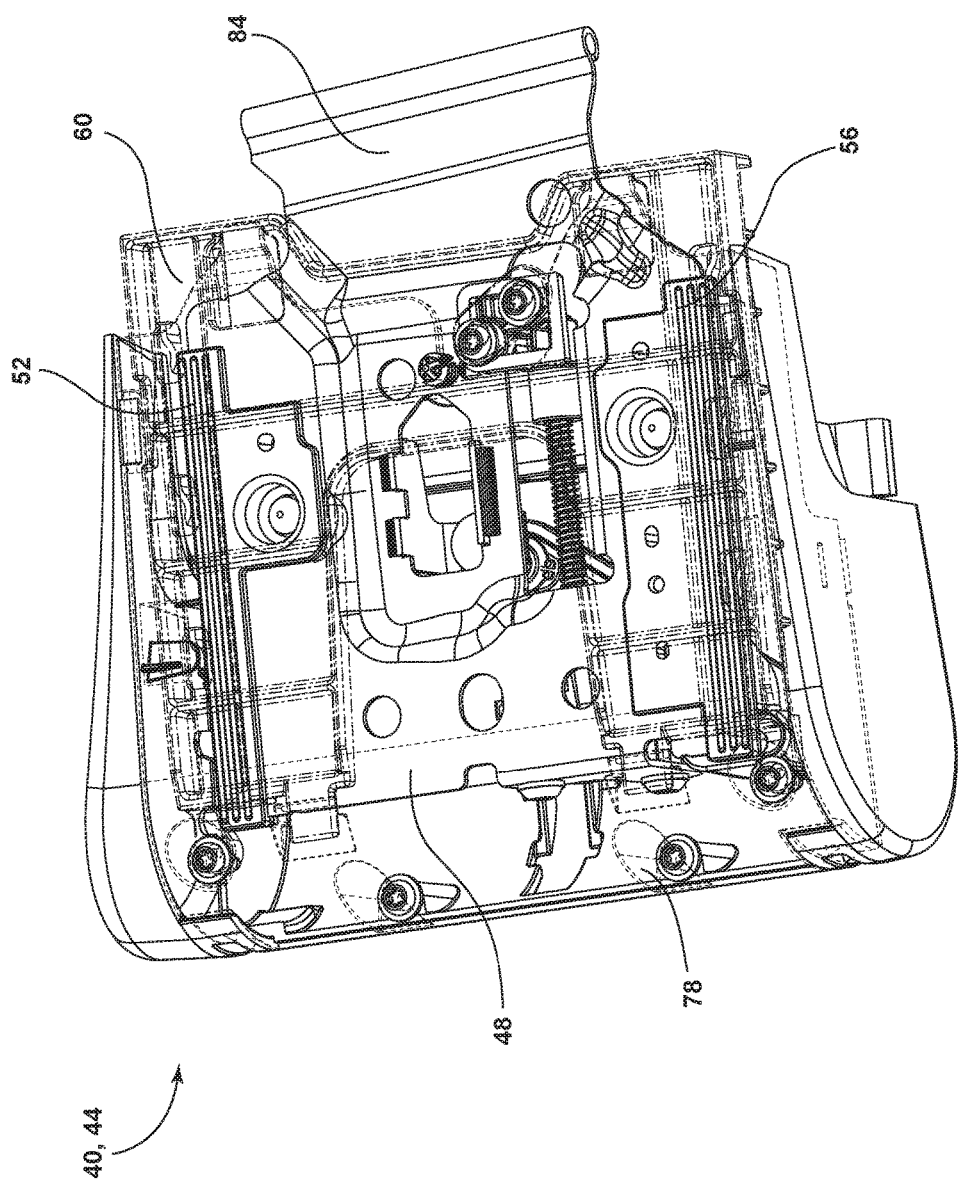
FIG. 3 is a top perspective view of one embodiment of an independent thigh support of the vehicle seating assembly with a shell of the independent thigh support in phantom.

Referring to FIG. 3, a top perspective view of one of the independent thigh supports 40, 44 is shown. The thigh-extension slider 60 and the thigh-extension cover plate 78 are shown in phantom. The inner and outer extension tracks 52, 56 of the thigh-extension plate 48 can be seen near the periphery of the independent thigh supports 40, 44. The thigh-extension plate 48 includes a rearwardly extending member 84, which is responsible for the operable coupling of the thigh-extension plate 48 to the seat carrier 36 (FIG. 2).

Figure 4:
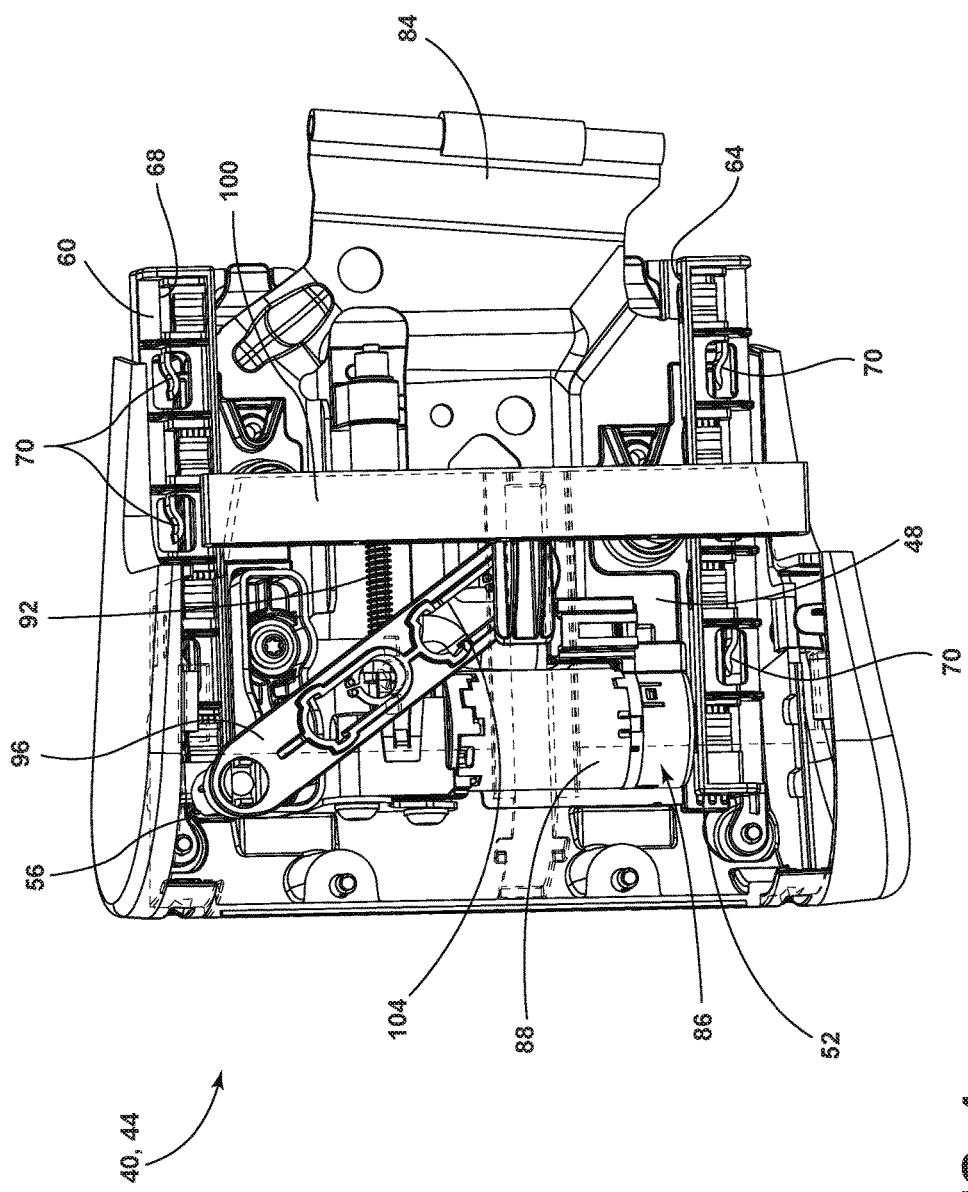
FIG. 4 is a bottom perspective view of the independent thigh support of FIG. 3.

Referring now to FIG. 4, a bottom perspective view of one of the independent thigh supports 40, 44 is shown. A drive mechanism 86 is mounted to the thigh-extension plate 48 and is also operably coupled to the thigh-extension slider 60. The drive mechanism 86 includes a motor 88 and a drive shaft 92. It is contemplated that the motor 88 can be any one of various motors that can include, but are not limited to, a screw-drive motor, a chain-drive motor, combinations thereof, and other similar motors 88. In order to guide the movement of the thigh-extension slider 60 as a result of operation of the motor 88, a guide linkage 96 can extend from a portion of the thigh-extension plate 48 to an operating member 100 coupled to the thigh-extension slider 60. In various embodiments, the guide linkage 96 can include an internal channel 104 that engages the operating member 100 and serves to limit the extension and outward movements 72, 74 (FIG. 2) of the thigh-extension slider 60 with respect to the thigh-extension plate 48. Accordingly, the operating member 100, when it reaches the extended position 82 (FIG. 2), engages a portion of the guide linkage 96 such that the guide linkage 96 stops additional extension and/or outward movements 72, 74 of the operating member 100 away from the thigh-extension plate 48. It is contemplated that the guide linkage 96 can be coupled to at least one of the inner and outer extension tracks 52, 56 such that the guide linkage 96 is rotationally and/or slidably connected to the inner and/or outer extension tracks 52, 56. It is also contemplated that the engagement of the guide linkage 96 and the operating member 100 can also guide the extension and outward movements 72, 74 of the thigh-extension slider 60 to account for both linear and non-linear motion of the thigh-extension slider 60.

Figure 5:
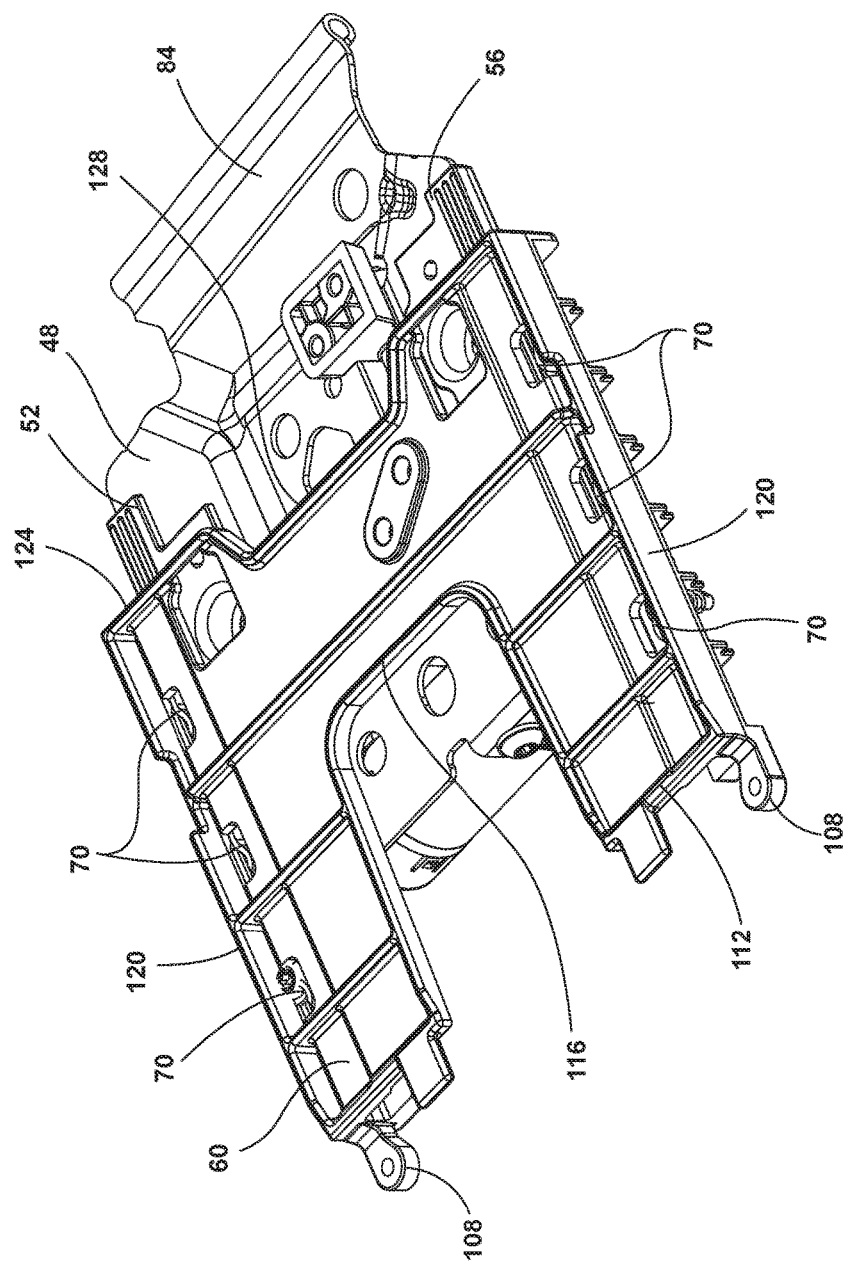
FIG. 5 is a top perspective view of one embodiment of a thigh-extension plate and a thigh-extension slider operably coupled together.

Referring to FIG. 5, a top perspective view of the thigh-extension plate 48 and the thigh-extension slider 60 operably coupled together is shown. The thigh-extension slider 60 slidably engages the thigh-extension plate 48. The thigh-extension slider 60 includes at least one forward-extending tab 108 that extends from a front wall 112 of the thigh-extension slider 60, wherein the front wall 112 defines a forward recess 116. The thigh-extension slider 60 further includes side walls 120, each of which contains the stabilizer tabs 70 integrally formed therein. A back wall 124 of the thigh-extension slider 60 defines a rearward recess 128. In one embodiment, the rearward recess 128 is smaller than the forward recess 116. The stabilizer tabs 70 are configured to provide a transverse tension force along a Y-axis of the vehicle seating assembly 24 (FIG. 1). The thigh-extension slider 60 can be made up of various components that can include, but are not limited to, glass-filled nylon and more specifically, 15 percent glass-filled nylon. The use of glass-filled nylon as at least a portion of the thigh-extension slider 60 provides a smooth sliding engagement with the material of the inner and outer extension tracks 52, 56. The thigh-extension slider 60 can further include a thigh cushion that operates with the thigh-extension slider 60 to ensure a cushioned and comfortable presentation of the independent thigh supports 40, 44 (FIG. 1) throughout the range of motion of the thigh-extension slider 60.

Figure 6:
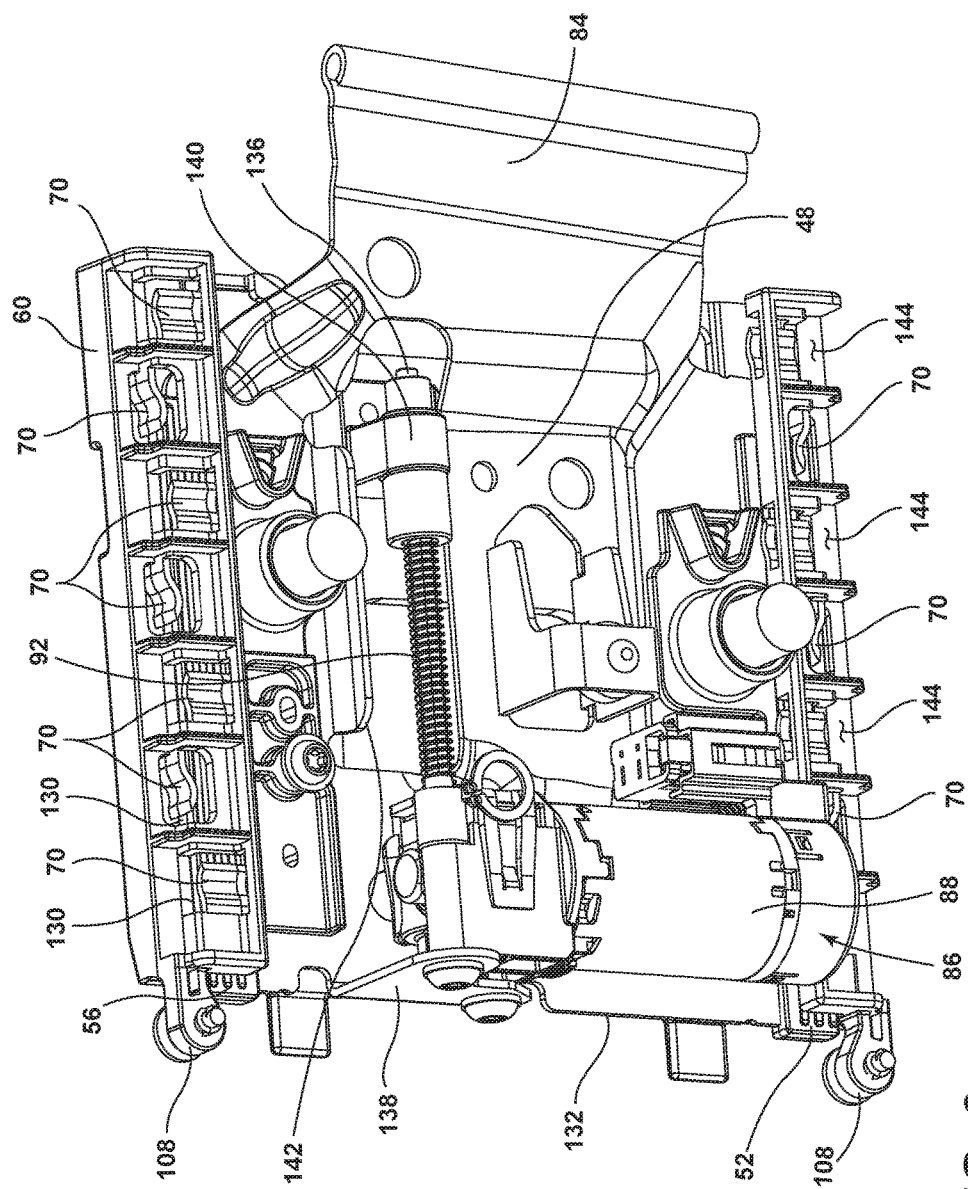
FIG. 6 is a bottom perspective view of the thigh-extension plate and the thigh-extension slider operably coupled together.

Referring now to FIG. 6, a bottom view of the thigh-extension plate 48 and the thigh-extension slider 60 operably coupled together is shown. The stabilizer tabs 70 resiliently engage with exterior edges 130 of the inner and outer extension tracks 52, 56. The drive mechanism 86 is operably coupled to the thigh-extension plate 48 at a first end 132 and to the thigh-extension slider 60 at a second end 136. The motor 88 is fixedly attached to an underside of the thigh-extension plate 48 by a motor mounting plate 138. The drive shaft 92 extends rearwardly from the motor 88 and engages with a coupler 140 at the second end 136 of the drive mechanism 86. Upon activation of the motor 88 the drive shaft 92 is acted on and induces a movement of the thigh-extension slider 60 relative to the thigh-extension plate 48. For example, in one embodiment, where the motor 88 is a screw-drive motor, the drive shaft 92 is threaded like a screw and the drive shaft 92 threadably engages with the coupler 140. In this embodiment, the motor 88 acts on the drive shaft 92 by rotating the drive shaft 92 and inducing movement of the coupler 140 either toward or away from the motor 88. During its movement the coupler 140 travels in a guide slot 142. The guide slot 142 is configured to permit linear movement of the coupler 140, and in turn, the thigh-extension slider 60. According to various embodiments, it is contemplated that the coupler 140 can slide within the guide slot 142 that has a non-linear configuration to allow for non-linear movement of the coupler 140 and also corresponding non-linear movement of the thigh-extension slider 60. As the thigh-extension slider 60 moves forward, back, up, down, out, in, and/or rotates under the power of the motor 88 there is a tendency for "binding" or "chuck" to occur laterally or perpendicularly to the direction of travel or force being applied. This failure mode can cause the features of movable seating assembly components to become inoperable, result in damage to components, and/or result in a significant reduction in the speed of operation, which can lead to customer dissatisfaction. The stabilizer tabs 70 of the present disclosure work in unison to maintain the thigh-extension slider 60 on the centerline of its travel by providing the transverse tension force along the Y-axis of the vehicle seating assembly 24 (FIG. 1). In another embodiment, the stabilizer tabs 70 provide a tension force along a Z-axis of the vehicle seating assembly 24. In yet another embodiment, the stabilizer tabs 70 are located within apertures 144 and alternate between the embodiment that provides a transverse tension force along the Y-axis and the embodiment that provides the tension force along the Z-axis of the vehicle seating assembly 24.

Figure 7:
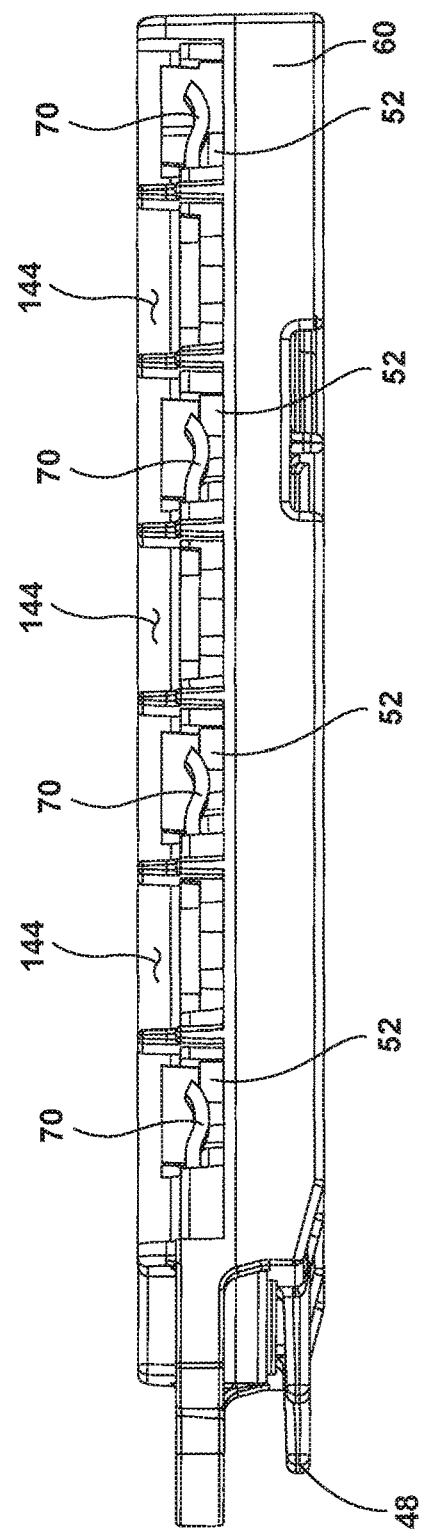
FIG. 7 is a side elevational view of another embodiment of the thigh-extension plate and the thigh-extension slider operably coupled together.

Referring to FIG. 7, a side view of the thigh-extension plate 48 and the thigh-extension slider 60 operably coupled together is shown. The stabilizer tabs 70 that provide a tension force along the Z-axis of the vehicle seating assembly 24 are shown. In this embodiment, the stabilizer tabs 70 resiliently engage with an underside of the inner and outer extensions tracks 52, 56. The principles and advantages discussed above for the stabilizer tabs 70 with regard to preventing binding or chuck are similarly present in this embodiment.

It will be understood by one of skill in the art that, although various figures have been discussed with regard to one of the independent thigh supports 40, 44, the independent thigh supports 40, 44 are assembled and operate in a substantially similar manner. Some elements of the independent thigh supports 40, 44 are arranged in a mirror image fashion when comparing the independent thigh supports 40, 44 to one another.

As movable seating assembly components, such as independent thigh supports 40, 44, are adjusted forward, back, up, down, in, out, and/or rotated there is a tendency for "binding" or "chuck" to occur laterally or perpendicularly to the direction of travel or force being applied. This failure mode can cause the features of movable seating assembly components to become inoperable, result in damage to components, and/or result in a significant reduction in the speed of operation, which can lead to customer dissatisfaction. The stabilizer tabs 70 of the present disclosure work in unison to maintain the thigh-extension slider 60 on the centerline of its travel by providing a tension force that is perpendicular or transverse to the thigh-extension plate 48. That is, the stabilizer tabs 70 provide a tension force along at least one of the X-, Y-, and Z-axis of the vehicle seating assembly 24, which is perpendicular to the direction of travel of the thigh-extension slider 60. By maintaining the thigh-extension slider 60 on its centerline of travel, binding, chuck, and otherwise lateral or perpendicular undesired motion of the thigh-extension slider 60 is prevented. Preventing binding, chuck, and otherwise lateral or perpendicular undesired motion of the thigh-extension slider 60 has many advantages, which include decreasing failure modes, increasing perceived quality, improving customer satisfaction, and increasing both durability and longevity of the independent thigh supports 40, 44.

Modifications of the concepts disclosed will occur to those skilled in the art and to those who make or use the concepts. Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

It will be understood by one having ordinary skill in the art that construction of the described concepts, and other components, is not limited to any specific material. Other exemplary embodiments of the concepts disclosed herein may be formed from a wide variety of materials, unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, and the nature or numeral of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further, it is to be understood that such concepts are intended to be covered by the following claims, unless these claims, by their language, expressly state otherwise.

What is claimed is:

1. A vehicle seating assembly comprising:
   a seat carrier including first and second independent thigh supports, each thigh support comprising:

a thigh-extension plate having inner and outer extension tracks;

a thigh-extension slider engaged with the thigh-extension plate, the thigh-extension slider defining inner and outer grooves slidably engaging the inner and outer extension tracks of the thigh-extension plate, respectively; and integrated stabilizer tabs that provide a transverse tension force along a Y-axis of the vehicle seating assembly.

2. The vehicle seating assembly of claim 1, wherein the integrated stabilizer tabs resiliently engage with exterior edges of the inner and outer extension tracks.

3. The vehicle seating assembly of claim 1, wherein a front wall of the thigh-extension slider defines a forward recess.

4. The vehicle seating assembly of claim 3, wherein a back wall of the thigh-extension slider defines a rearward recess, and wherein the rearward recess is smaller than the forward recess.

5. The vehicle seating assembly of claim 3, wherein the thigh-extension plate is a metallic plate that is fixedly connected to the seat carrier.

6. The vehicle seating assembly of claim 3, wherein the thigh-extension slider includes a thigh cushion that operates with the thigh-extension slider.

7. The vehicle seating assembly of claim 3, further comprising:

a motor engaging with the thigh-extension slider.

8. The vehicle seating assembly of claim 7, wherein the motor is a screw-drive motor.

9. The vehicle seating assembly of claim 3, wherein the thigh-extension slider is made of glass-filled nylon.

10. The vehicle seating assembly of claim 9, wherein the thigh-extension slider includes 15 percent glass-filled nylon.

11. A thigh-extension for a seating assembly comprising:
a metallic thigh-extension plate;
an extension track engaged with the metallic thigh-extension plate;
a thigh-extension slider having an integral groove slidably engaged with the extension track; and
a plurality of stabilizer tabs integrally formed with the thigh-extension slider, wherein the plurality of stabilizer tabs resiliently engage with exterior edges of the extension track.

12. The thigh-extension for a seating assembly of claim 11, wherein the extension track includes inner and outer extension tracks that slidably engage respective inner and outer grooves defined within the thigh-extension slider.

13. The thigh-extension for a seating assembly of claim 11, wherein the metallic thigh-extension plate is fixedly connected to a seat carrier.

14. The thigh-extension for a seating assembly of claim 11, further comprising:
a screw-drive motor coupled to the thigh-extension slider and the metallic thigh-extension plate.

15. The thigh-extension for a seating assembly of claim 11, wherein the plurality of stabilizer tabs are configured to provide a transverse tension force along a Y-axis of said seating assembly.

16. A seat base for a seating assembly comprising:
a thigh-extension plate;
an extension track engaged with the thigh-extension plate;
a thigh-extension slider engaged with the extension track; and
a plurality of stabilizer tabs resiliently engaged with exterior edges of the extension track.

17. The seat base for a seating assembly of claim 16, wherein the plurality of stabilizer tabs are configured to provide a transverse tension force along a Y-axis of said seating assembly.

* * * * *